(12) United States Patent
Seto et al.

(10) Patent No.: US 7,054,723 B2
(45) Date of Patent: May 30, 2006

(54) INFORMATION PRESENTATION CONTROLLING APPARATUS AND METHOD BASED ON DRIVER'S MENTAL FATIGUE

(75) Inventors: Fumio Seto, Kanagawa (JP); Toshiaki Takahashi, Yokohama (JP); Yasuhide Yamamoto, Tokyo (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/366,321

(22) Filed: Feb. 14, 2003

(65) Prior Publication Data

US 2003/0182028 A1    Sep. 25, 2003

(30) Foreign Application Priority Data

Mar. 22, 2002    (JP) .............................. 2002-080533

(51) Int. Cl.
    *G06F 7/00*     (2006.01)
    *B60Q 1/00*     (2006.01)
    *G08B 23/00*    (2006.01)

(52) U.S. Cl. .................... 701/1; 340/439; 340/460; 340/576; 180/272

(58) Field of Classification Search .................... 701/1, 701/36; 340/436, 438–439, 471, 501–502, 340/573.1, 517, 526, 540, 575–576, 425.5, 340/475, 521–523, 459–461; 180/271–275; 600/300, 544–549, 500, 26–28; 715/700, 715/716, 727–730
See application file for complete search history.

(56) References Cited

U.S. PATENT DOCUMENTS

| | | | | |
|---|---|---|---|---|
| 4,031,527 A | * | 6/1977 | Yanagishima et al. | 340/576 |
| 4,058,796 A | * | 11/1977 | Oishi et al. | 340/459 |
| 4,450,438 A | * | 5/1984 | Seko et al. | 340/576 |
| 4,834,205 A | * | 5/1989 | Mizuno et al. | 180/422 |
| 5,432,509 A | * | 7/1995 | Kajiwara | 340/903 |
| 5,574,641 A | * | 11/1996 | Kawakami et al. | 701/1 |
| 5,648,755 A | * | 7/1997 | Yagihashi | 340/439 |
| 5,694,116 A | * | 12/1997 | Kojima | 340/576 |
| 5,717,606 A | * | 2/1998 | Hara et al. | 701/44 |
| 5,801,667 A | * | 9/1998 | Shimizu et al. | 345/7 |
| 5,815,070 A | * | 9/1998 | Yoshikawa | 340/439 |

(Continued)

FOREIGN PATENT DOCUMENTS

FR    2742706 A1 *    6/1997

(Continued)

*Primary Examiner*—Jacques H. Louis-Jacques
(74) *Attorney, Agent, or Firm*—McDermott Will & Emery LLP

(57) ABSTRACT

In information presentation controlling apparatus and method, a detecting section detects a running state of a mobile body and a running environment thereof, a mental fatigue calculating section calculates a mental fatigue that an operator of the mobile body (specifically, a vehicle driver) suffers due to an operation of the mobile body (an automotive vehicle) from a result of detection by the detecting section, a producing section produces the information to the operator of the mobile body, and an information presentation controlling section controls the information to be produced to the operator of the mobile body through the producing section in accordance with the mental fatigue calculated by the mental fatigue calculating section.

19 Claims, 5 Drawing Sheets

U.S. PATENT DOCUMENTS

| | | | | |
|---|---|---|---|---|
| 5,925,082 A | * | 7/1999 | Shimizu et al. | 701/41 |
| 6,014,605 A | * | 1/2000 | Morisawa et al. | 701/65 |
| 6,023,227 A | * | 2/2000 | Yanko et al. | 340/576 |
| 6,025,775 A | * | 2/2000 | Erlandson | 340/436 |
| 6,218,947 B1 | * | 4/2001 | Sutherland | 340/576 |
| 6,278,362 B1 | * | 8/2001 | Yoshikawa et al. | 340/439 |
| 6,366,207 B1 | * | 4/2002 | Murphy | 340/576 |
| 6,512,529 B1 | * | 1/2003 | Janssen et al. | 715/790 |
| 6,575,902 B1 | * | 6/2003 | Burton | 600/300 |
| 6,741,223 B1 | * | 5/2004 | Kobayashi et al. | 345/7 |
| 6,876,307 B1 | | 4/2005 | Spitzer et al. | |
| 2003/0073886 A1 | * | 4/2003 | Yanagidaira et al. | 600/300 |
| 2004/0036601 A1 | * | 2/2004 | Obradovich | 340/540 |

FOREIGN PATENT DOCUMENTS

| | | | |
|---|---|---|---|
| GB | 2340646 A | * | 2/2000 |
| JP | 7195961 | | 8/1995 |
| JP | 07-277041 | | 10/1995 |
| JP | 8240444 | | 9/1996 |
| JP | 2001213194 | | 8/2001 |
| JP | 20011304894 | | 10/2001 |
| WO | WO 9622897 A1 | * | 8/1996 |

* cited by examiner

FIG.4A

| ROAD PROPERTY · KIND | MENTAL FATIGUE |
|---|---|
| GENERAL ROAD | 0.5 |
| NATIONAL ROAD | 1 |
| HIGHWAY ROAD | 0.3 |

FIG.4B

| ROAD SHAPE | MENTAL FATIGUE |
|---|---|
| CURVED ROAD | 1 |
| STRAIGHT LINE | 0 |
| INTERSECTION | 1.5 |

FIG.4C

| DAY | TIME | MENTAL FATIGUE |
|---|---|---|
| FROM MONDAY TO FRIDAY | 6:00-8:00 | 2 |
| FROM MONDAY TO FRIDAY | 8:00-18:00 | 0 |
| FROM MONDAY TO FRIDAY | 18:00-6:00 | 0.3 |
| HOLIDAY | 6:00-18:00 | 0 |
| HOLIDAY | 18:00-6:00 | 1 |

FIG.4D

| WEATHER | MENTAL FATIGUE |
|---|---|
| FINE | 0 |
| RAIN | 1 |

INFORMATION PRESENTATION CONTROLLING APPARATUS AND METHOD BASED ON DRIVER'S MENTAL FATIGUE

BACKGROUND OF THE INVENTION

1. Field of the Invention

The present invention relates to information presentation controlling apparatus and method for presenting various kinds of information so as to produce each of various kinds of information to an operator which operates a movable body (or mobile body such as an automotive vehicle).

2. Description of the Related Art

A Japanese Patent Application First Publication No. Heisei 7-277041 published on Oct. 24, 1996 exemplifies a previously proposed information presentation controlling apparatus which produces a vehicular run assistance information and a various kinds of information to a driver (the operator) that manipulates a vehicle in accordance with a vehicular running state and a vehicular running environment.

SUMMARY OF THE INVENTION

In the previously proposed information presentation controlling apparatus, however, a control of the presentation of the information to be produced to the driver is not carried out, with a mental fatigue accumulated in the vehicle driver (or operator) in accordance with a change in the running environment taken into consideration. For example, the driver carries out the vehicular manipulation during a vehicular run on a freeway (or highway) from a departure point of location can easily recognize a plurality of information displayed through an information display image screen since the mental fatigue due to a vehicular manipulation number of times is not so high. However, the driver carries out many manipulations of the vehicle due to the vehicular run on national roadways from the departure point and the vehicle has passed through a plurality of traffic intersections and curved road so that the driver has accumulated a large amount of mental fatigues and requires more forces of concentrations to recognize the plurality of information displayed on the information producing display image.

It is, hence, an object of the present invention to provide improved information presentation controlling apparatus and method which are capable of adjustably controlling the information to be produced to the driver (in broad sense of the term, the operator of the mobile body) in accordance with a mental fatigue accumulated in the driver due to manipulations by the vehicle driver.

According to a first aspect of the present invention, there is provided an information presentation controlling apparatus, comprising: a detecting section that detects a running state of a mobile body and a running environment thereof; a mental fatigue calculating section that calculates a mental fatigue that an operator of the mobile body suffers due to an operation of the mobile body from a result of detection by the detecting section; a producing section that produces the information to the operator of the mobile body; and an information presentation controlling section that controls the information to be produced to the operator of the mobile body through the producing section in accordance with the mental fatigue calculated by the mental fatigue calculating section.

According to a second aspect of the present invention, there is provided an information presentation controlling apparatus for an automotive vehicle, comprising: a running environment information retrieving section that retrieves an information on a running environment of the vehicle and estimates a degree of a mental fatigue that the vehicle driver would normally suffer during a drive of the vehicle from the retrieved running environment for each predetermined time interval; a vehicular running situation detecting section that detects a vehicular running situation and estimates a corrective mental fatigue that the vehicle driver would suffer due to a sudden happening during the drive of the vehicle from the detected vehicular running situation for each predetermined time interval; an accumulated mental fatigue calculating section that adds the corrective mental fatigue estimated by the vehicular running situation detecting section to the mental fatigue estimated from the running environment information retrieving section so as to determine an accumulated mental fatigue; and an information presentation controlling section that controls a quantity of information to be presented to the vehicle driver through a producing section in accordance with a magnitude of the accumulated mental fatigue.

According to a third aspect of the present invention, there is provided an information presentation controlling method, comprising: detecting a running state of a mobile body and a running environment thereof; calculating a mental fatigue that an operator of the mobile body suffers due to an operation of the mobile body from a result of detecting the running state of the mobile body and the running environment thereof; producing the information to the operator of the mobile body through a producing section; and controlling the information to be produced to the operator of the mobile body through the producing section in accordance with the calculated mental fatigue.

According to a fourth aspect of the present invention, there is provided an information presentation controlling method for an automotive vehicle, comprising: retrieving an information on a running environment of the vehicle; estimating a degree of a mental fatigue that the vehicle driver would normally suffer during a drive of the vehicle from the retrieved running environment for each predetermined time interval; detecting a vehicular running situation; estimating a corrective mental fatigue that the vehicle driver would suffer due to a sudden happening during the drive of the vehicle from the detected vehicular running situation for each predetermined time interval; adding the estimated corrective mental fatigue to the estimated mental fatigue so as to determine an accumulated mental fatigue; and controlling a quantity of information to be presented to the vehicle driver through a producing section in accordance with a magnitude of the accumulated mental fatigue.

This summary of the invention doe not necessarily describe all necessary features so that the invention may also be a sub-combination of these described features.

BRIEF DESCRIPTION OF THE DRAWINGS

FIGS. 4A, 4B, 4C, and 4D are explanatory view for explaining a relationship between a running environment and a mental fatigue.

DETAILED DESCRIPTION OF THE PREFERRED EMBODIMENT

Reference will hereinafter be made to the drawings in order to facilitate a better understanding of the present invention.

The present invention has a basic concept such that a mental fatigue accumulated in a vehicle driver in accordance with a change in a running environment during a drive of an automotive vehicle is calculated and in accordance with the calculated mental fatigue the information to be produced to the driver is varied. The mental fatigue that the driver has suffered due to a sudden happening other than the mental fatigue caused by the change in the running environment is calculated as a corrective mental fatigue so as to be added to the mental fatigue. Consequently, a more accurate grasping of the mental fatigue that the driver suffers can be achieved.

Figure 1:
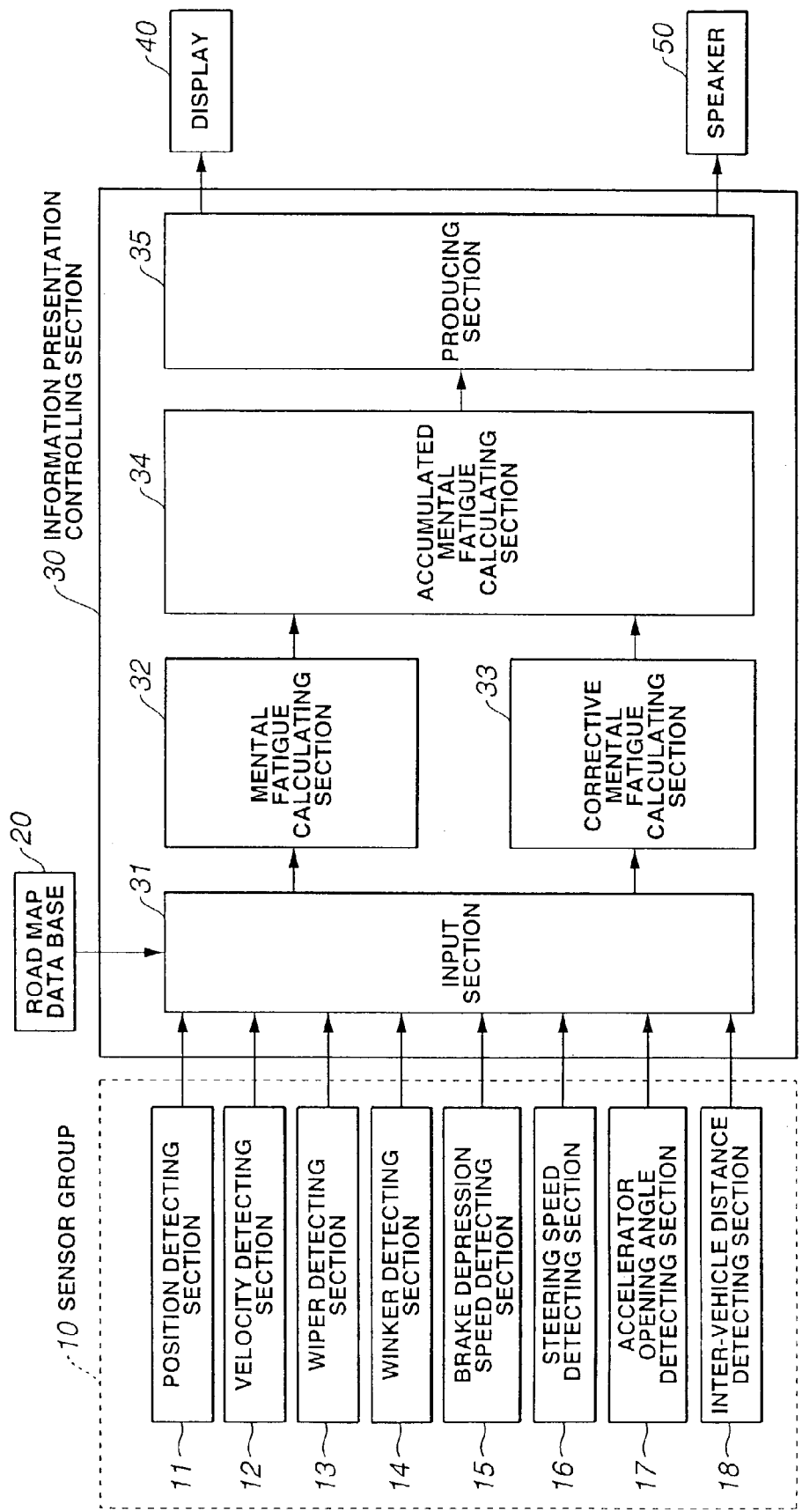
FIG. 1 is a schematic functional block diagram of an information presentation controlling apparatus in a preferred embodiment according to the present invention.

FIG. 1 shows a schematic functional block diagram of an information presentation controlling apparatus in a preferred embodiment according to the present invention.

In FIG. 1, a sensor group 10 having a plurality of detecting sections to detect a vehicular state and a running environment and a road map data base 20 are connected to an information presentation controlling section 30. In addition, a display 40 and a speaker 50 are connected to information presentation controlling section 30. Information presentation controlling section 30 receives the information from sensor group 10 and road map data base 20 and calculates the mental fatigue that the driver receives. In accordance with the calculated mental fatigue, information presentation controlling section 30 controls the information produced to the driver via display 40 and speaker 50 in accordance with the calculated mental fatigue.

Sensor group 10 outputs the information from each detecting section to an input section 31 within information presentation controlling section 30. Sensor group 20 outputs the information from each detecting section to an input section 31 within information presentation controlling section 30. Sensor group 10 includes a position detecting section 11, a (vehicular) velocity detecting section 12, a wiper detecting section 13, a winker detecting section 14, a brake depression velocity detecting section 15, a steering speed detecting section 16, an accelerator opening angle detecting section 17, and a vehicular interval (inter-vehicle) distance detecting section 18.

Position detecting section 11 serves to obtain the present position of the vehicle and the present date by receiving electric waves received from a plurality of measuring satellites using a GPS (Global Positioning System) antenna. Velocity detecting section 12 detects a velocity of the vehicle. Wiper detecting section 13 detects a presence or absence of a use of a wiper installed on the vehicle. Winker detecting section 14 detects the presence or absence of a use of a winker during the vehicular run on a left or right turn. Furthermore, brake depression velocity detecting section 15 detects an angular velocity of a brake pedal depression when the driver depresses the brake pedal.

Steering detecting section 16 detects the angular velocity of a steering wheel of the vehicle when the driver steers the steering wheel in a leftward or rightward direction as viewed from the driver. Accelerator opening angle detecting section 17 serves to detect the angular velocity when the driver depresses an accelerator pedal. Inter-vehicle distance detecting section 18 detects the distance between the vehicle (host vehicle) and a preceding vehicle running ahead of the host vehicle. In addition, road map data base 20 stores the position of the host vehicle (the vehicle in which the information presentation controlling apparatus according to the present invention is mounted) and the road information (for example, a road shape, a road attribute (property), a kind of road, and a traffic intersection).

Information presentation controlling section 30 includes an input section 31, a mental fatigue calculating (estimating) section 32, a corrective mental fatigue calculating (estimating) section 33, and an accumulated mental fatigue calculating section 34, and information producing section 35. Input section 31 inputs various kinds of information from sensor group 10 and road map data base 20. Input section 31, then, outputs the mental fatigue calculating information to mental fatigue calculating section 32 and corrective mental fatigue calculating section 33. Mental fatigue calculating section 32 calculates the mental fatigue from mental fatigue calculating information inputted and calculates the corrective mental fatigue from the inputted mental fatigue calculating information inputted. Producing section 35 controls the information produced by speaker 40 and display 50 on the basis of the calculated accumulated mental fatigue.

Input section 31 has functions as follows: obtaining the information from sensor group 10; retrieving the road information from road map data base 20 according to the positional information detected by the position detecting section 11; determining whether the road shape retrieved from road information is in the curved road or straight line road; calculating a day of a week according to the date detected by position detecting section 11; determining a weather according to the presence or absence of the use of wipers retrieved from a wiper detecting section 13; and outputting the retrieved various information and the above-described calculated information as the mental fatigue calculating information to mental fatigue calculating section 32 and to corrective mental fatigue calculating section 33. Mental fatigue calculating section 32 calculates a mental fatigue for a predetermined interval of distance that the driver ordinarily (or normally) receives (suffers) due to the variation in the running environment during the drive of the vehicle according to the calculated mental fatigue information inputted and outputs the calculated mental fatigue as the mental fatigue to accumulated mental fatigue calculating section 34. In addition, according to the mental fatigue calculating information inputted, the corrective mental fatigue calculating section 33 calculates the mental fatigue that the driver receives from the sudden happening (accident) and outputs the calculated mental fatigue as being the corrected (corrective) mental fatigue to accumulated mental fatigue calculating section 34.

Accumulated mental fatigue calculating section 34 calculates the mental fatigue that the driver suffers during the drive of the vehicle using the inputted mental fatigue and corrective mental fatigue and outputs the calculated result as accumulated mental fatigue to (information) producing section 35. Producing section 35 prepares the information to be produced to the driver in accordance with the inputted accumulated mental fatigue. The contents of producing the information are outputted to display 40 and/or speaker 50. It is noted that the information presentation controlling section 30 includes a microcomputer having a CPU (Central Processing Unit), a ROM (Read Only Memory), a RAM (Random Access Memory), an Input/Output interface, and a common bus.

Figure 2:
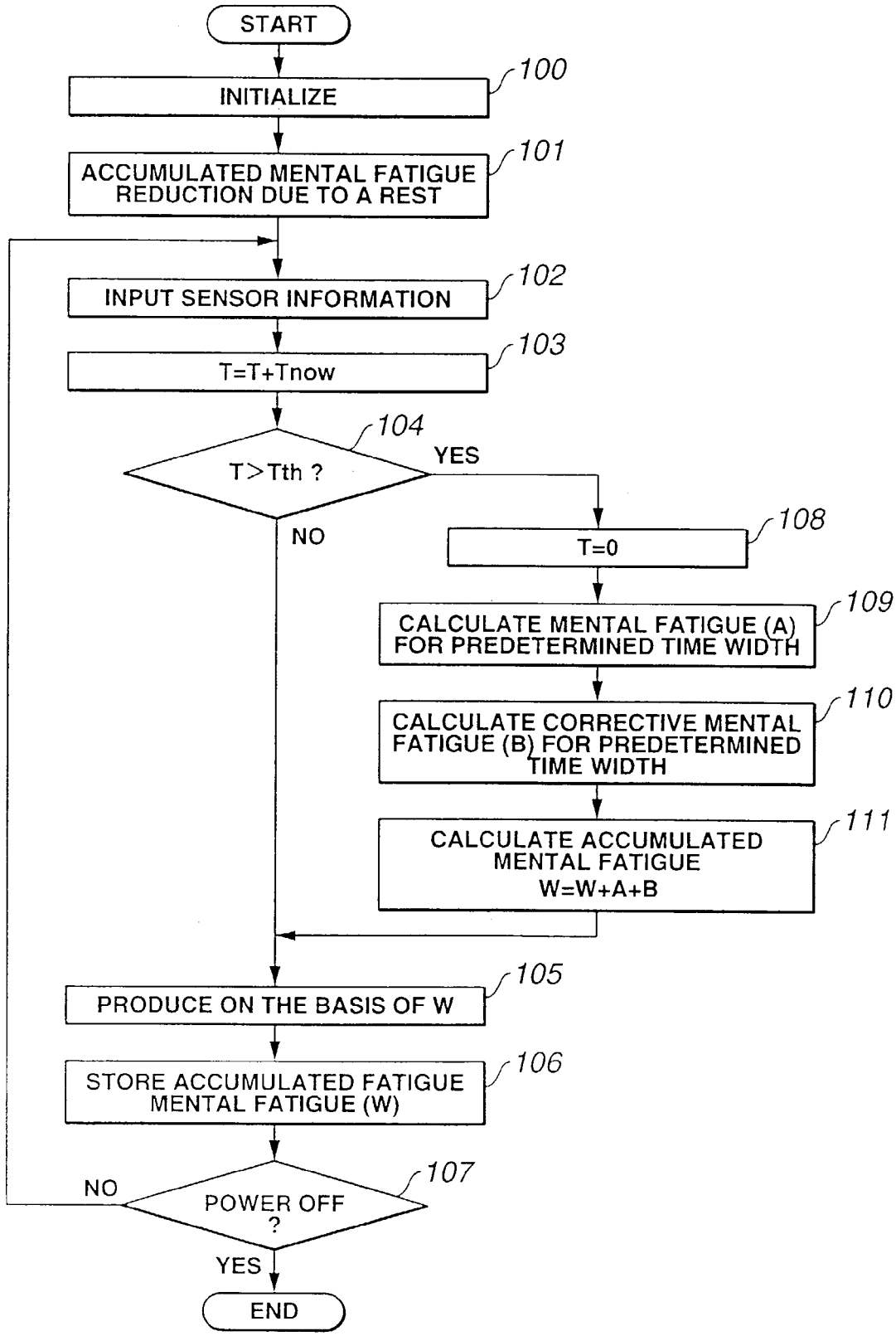
FIG. 2 is an operational flowchart for explaining an operational flow of an accumulated information presentation controlling apparatus shown in FIG. 1.

Next, FIG. 2 shows an operational flowchart for explaining an operation of the information presentation controlling apparatus in the embodiment described above.

A vehicular system power supply is turned on and a series of processes are started. At a step 100, information presentation controlling section 30 initializes (T=0) a parameter (T) to measure a time width of a predetermined interval of time. At a step 101, in accordance with a passage of time from a time at which the vehicular system power supply is turned off, a value of the accumulated mental fatigue (W) stored at a step 106, as will be described later, is reduced. This is because when the vehicular power supply is turned off, the driver is deemed to take a rest and the accumulated mental fatigue (W) is reduced. It is noted that, in the initialized state wherein accumulated mental fatigue (W) is not calculated, information presentation controlling section 30 determines that no accumulated mental fatigue is not present and the routine jumps to a step 102.

At step 102, information presentation controlling section 30 retrieves the information on the vehicular state from sensor group 10 and inputs the retrieved information to input section 31. Input section 31 determines the road shape viz., whether the road is straight road (straight line) or curved road (curved form). In addition, input section 31 calculates the day of a week from the information on the date received from sensor group 10, calculates the weather viz., calculates a rainy weather when the use of the wiper is recognized and a fine weather when the use of the wiper is not present, and outputs the retrieved information from each detecting section of sensor group 10 to mental fatigue calculating section 32. The predetermined information detected by sensor group 10 is outputted to corrective mental fatigue calculating section 33.

At a step 103, information presentation controlling section 30 adds a time (Tnow) during which the information from sensor group 10 is presently inputted at step 102 to parameter (T) to measure the time width of the predetermined interval of time so as to update parameter (T) (T=T+Tnow). At a step 104, information presentation controlling section 30 determines whether parameter (T) is in excess of a predetermined time interval (Tth), for example, five seconds. If T>Tth (Yes) at step 104, the routine goes to a step 108. If T≦Tth (No) at step 104, the routine goes to a step 105. The predetermined time interval (Tth) is a reference value to perform a mental fatigue calculation processing at a constant interval and, if parameter (T) is in excess of predetermined time interval (Tth) (Yes at step 104), the mental fatigue is calculated as will be described later.

Figure 5:
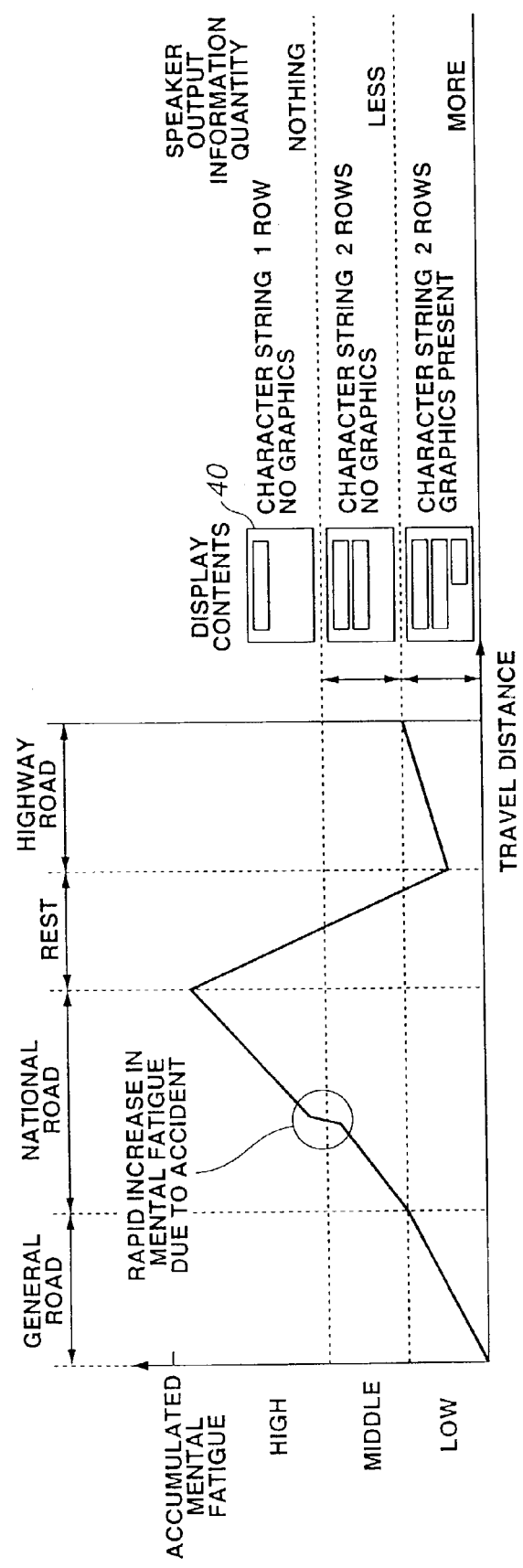
FIG. 5 is an explanatory view for explaining a relationship between the accumulated mental fatigue and the information to be produced to a vehicle driver.

Then, at step 105, if accumulated mental fatigue (W) is calculated at a step 111 as will be described later, information presentation controlling section 30 modifies the contents to be produced to the driver via display 40 and speaker 50 in accordance with the accumulated mental fatigue (W) calculated at the step 111. The contents to be produced to the driver are modified in accordance with the accumulated mental fatigue (W) presently stored when the accumulated mental fatigue (W) is not calculated. For example, as shown in FIG. 5, the accumulated mental fatigue in the driver is increased or decreased by moving various locations while driving the vehicle.

When the accumulated mental fatigue is low, the mental fatigue that the driver suffers is less so that a complex recognition of the information to be produced is possible. Hence, in this case, character strings of two rows and graphics are displayed, as shown in FIG. 5, and speaker 50 provides much information quantities. In addition, when the accumulated mental fatigue is in a middle range, the contents of information to be produced to the driver is such that only two character strings are displayed through display 40 and a small quantity of information are outputted through speaker 50. Furthermore, when the accumulated mental fatigue is high, the mental fatigue to the driver is excessively much so that it is difficult to recognize a complex information presentation. Hence, the contents of information to be produced to the driver are such that only one character string is displayed through display 40 and no output through speaker 50 is carried out.

As described above, the information to be produced to the driver through display 40 and speaker 50 is restricted to only those having a high priority to be produced as the accumulated mental fatigue of driver becomes high and the information quantity is reduced. Hence, even when the mental fatigue by the driver is high, the information having a high priority to be produced can be recognized.

Referring back to FIG. 2, at a step 106, information presentation controlling section 30 stores the accumulated mental fatigue (W) on the basis of which the information is produced to the driver at the present step 105. It is noted that the stored accumulated mental fatigue (W) is used to perform the processing when the accumulated mental fatigue is reduced at step 101 when, at the next routine, the vehicular system power supply is turned on and the mental fatigue calculation procedure is started. At a step 107, if the vehicular system power supply is turned off (Yes), the present routine shown in FIG. 2 is ended. On the other hand, if no power supply is turned off (No) at step 107, the routine jumps to step 102.

It is noted that, at step 104, if T>Tth (Yes), the routine goes to a step 108. At step 108, the value of parameter (T) is initialized (T=0). At the next step 109, such a process as to calculate the mental fatigue (A) that the driver receives for the predetermined time width from the time of T=0 to the time of T=Tth is executed. At the next step 110, such a corrective mental fatigue (B) that the driver receives along the predetermined time width fro the time of T=0 to a time of T=Tth is calculated. At a step 111, the mental fatigue (A) derived at the present processing and the corrective mental fatigue (B) are added to the presently stored accumulated mental fatigue (W) so as to update the accumulated mental fatigue (W) and the present routine goes to step 104 described above.

Figure 3:
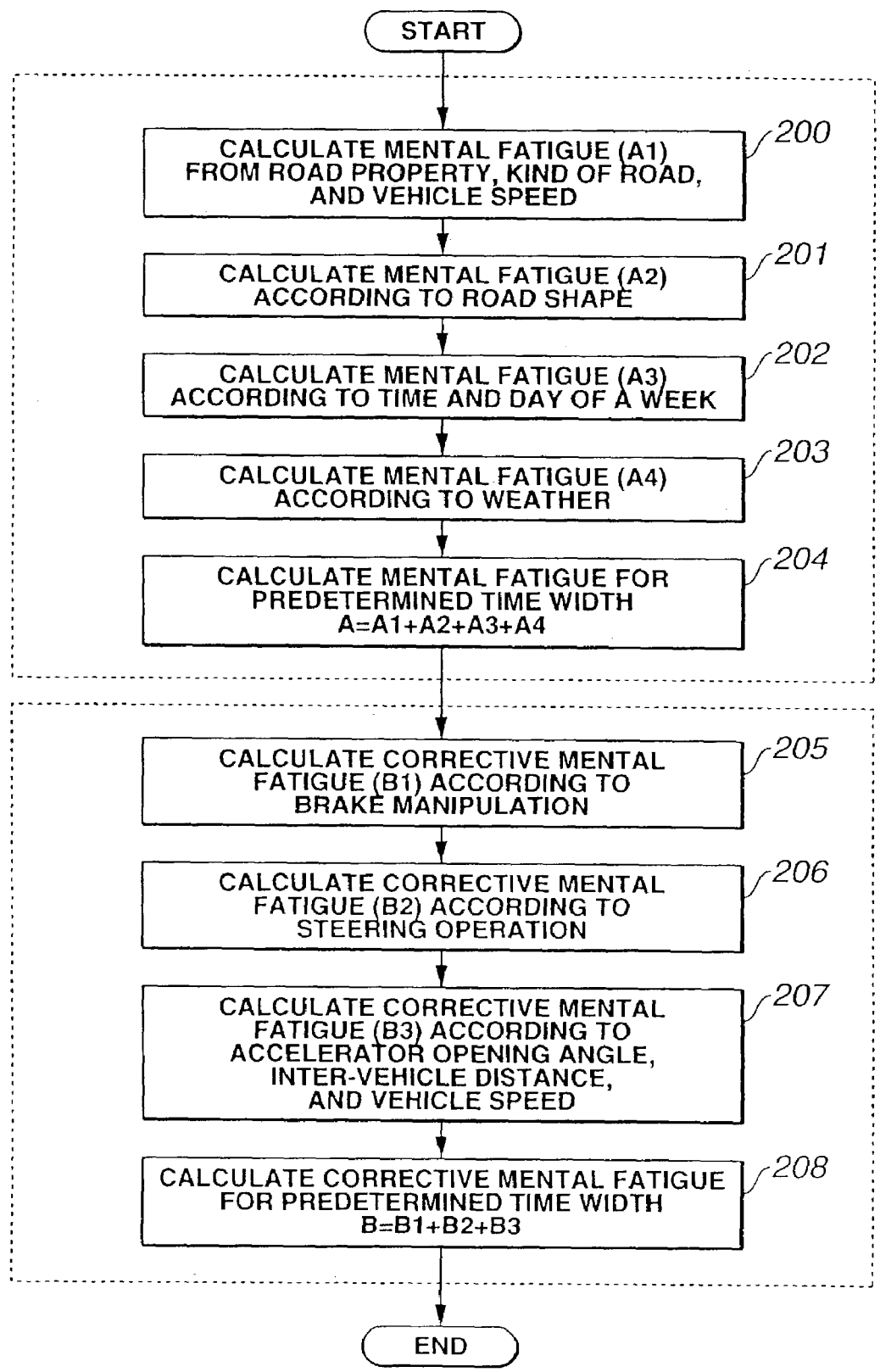
FIG. 3 is an detailed flowchart for explaining a flow of the accumulated mental fatigue calculating process shown in FIG. 2.

Next, FIG. 3 shows each detailed processing routine of steps 109 and 110 shown in FIG. 2.

At a step 200, mental fatigue calculating section 32 calculates a first mental fatigue (A1) according to a road property (attribute) and kind of road inputted from input section 31. A method of calculating first mental fatigue (A1) is, for example, as shown in FIG. 4A, in the case of a general road, the mental fatigue is supposed to be 0.5, in the case of a national roadway, the mental fatigue is supposed to be 1, and in the case of the freeway road (highway), the mental fatigue is supposed to be 0.3. This value of the mental fatigue may be modified according to the present vehicular velocity (for example, in the general road, the vehicular velocity is 80 km/h or higher, the mental fatigue is supposed to be 1).

At the next step 201, mental fatigue calculating section 32 calculates a second mental fatigue (A2) according to the inputted road shape information. A method of calculating the second mental fatigue is, for example, as shown in FIG. 4B, in a case where the road shape is the curved road, the mental fatigue is supposed to be 1, in the case where the road shape is the straight road, the mental fatigue is supposed to be zero, and in the case where the road shape is an intersection (provided that the winker is operated for the vehicle to indicate the turn right or left), the mental fatigue is supposed to be 1.5.

At the next step 202, mental fatigue calculating section 32 calculates a third mental fatigue (A3) according to the information on the inputted day of the week and date. A method of calculating this mental fatigue is, as shown in FIG. 4C, such that, in a case when it is a time from six o'clock to eight o'clock of the normal week day, the mental fatigue is supposed to be 2, in a case when it is a time from 8 o'clock up to 18 o'clock, the mental fatigue is supposed to be 0, and, in a case when it is a time from 18 o'clock to 6 o'clock, the mental fatigue is supposed to be 1.

At a step 203, mental fatigue calculating section 32 calculates a fourth mental fatigue (A4) according to the weather information inputted. A method of calculating this mental fatigue (A4) is, as shown in FIG. 4D, such that, in a case where the weather is fine, the mental fatigue is supposed to be 0 and, in a case where the weather is rainy, the mental fatigue is supposed to be 1.

At a step 204, mental fatigue calculating section 32 calculates a total mental fatigue (A) for the predetermined time width by adding first through fourth mental fatigue values (A=A1+A2+A3+A4) calculated at steps 200 through 203. Steps 200 through 204 denote mental fatigue calculating process at step 109 shown in FIG. 1.

Next, at a step 205, corrective mental fatigue calculating section 33 substitutes a predetermined value (for example, B1=30) into corrective mental fatigue (B1) if the angular velocity of depression of the brake pedal by the driver is in excess of a predetermined value on the basis of the inputted mental fatigue calculation information inputted from input section 31 when the driver depresses brake pedal (for example, in a case where a depression angle equal to or deeper than 15 degrees is present).

At the next step 206, corrective mental fatigue calculating section 33 substitutes a predetermined value (B2=30) into corrective mental fatigue (B2) if an angular velocity when the driver turns the steering wheel of the vehicle in the leftward or rightward direction is in excess of a predetermined value (for example, in a case where the driver turns the steering wheel in the leftward or rightward direction equal to or wider than 15 degrees for 10 milliseconds). At the next step 207, corrective mental fatigue calculating section 33 substitutes a predetermined value into corrective mental fatigue (B3) in a case where the angular velocity when the driver depresses the accelerator pedal is integrated for a predetermined interval and the integrated value is equal to or larger than a predetermined value or the distance to the preceding vehicle is equal to or shorter than the predetermined value (It is noted that the predetermined value on the distance is varied in accordance with the vehicular velocity. For example, if the vehicular velocity is 80 Km/h, the inter-vehicle distance predetermined value is set to 10 meters and, if the vehicular velocity is 50 Km/h, the predetermined value is set to 5 meters.).

At a step 208, corrective mental fatigue calculating section 33 calculates the corrective mental fatigue (B) for the predetermined time width by adding the calculated corrective mental fatigue values (B1, B2, and B3) calculated at steps 205 through 207 together. Steps 205 through 208 represent the corrective mental fatigue calculating procedure at step 110.

As described above, the mental fatigue (A) that the driver receives through the ordinary driving operations is added to the corrective mental fatigue (B) that receives due to the occurrence of the sudden accident to calculate the accumulated mental fatigue. Hence, a more accurate mental fatigue that the driver receives can be grasped.

In the embodiment described above, sensor group 10 constitutes detecting means, display 40 and speaker 50 constitutes producing means. In addition, steps 200 through 208 constitute mental fatigue calculating means and producing section 35 constitute information producing control means.

In the information producing control apparatus in the embodiment, the information to be produced to the driver via display 40 and speaker 50 is controlled in accordance with the mental fatigue accumulated in the driver due to various causes when the driver drives the vehicle so that, in the driver's mental state, a most recognizable information production can be carried out. When the mental fatigue that the driver suffers indicates much mental fatigue, only the information having the high priority is produced. Thus, a force of the concentration required to recognize the information to be produced to the driver can be reduced. Thus, the driver can concentrate on the driving. It is noted that, in the embodiment, the accumulated mental fatigue is calculated for each predetermined time width. However, it is possible to calculated the accumulated mental fatigue whenever the vehicle has moved by a predetermined interval of distance (the predetermined interval of distance may be monitored by an odometer of the vehicle). It is also noted that, in the embodiment, the information presentation controlling apparatus is applied to the automotive vehicle. However, the present invention is applicable to a two-wheel motor cycle or other mobile bodies.

It is also noted that, in the embodiment, display 40 and speaker 50 have been used as producing means. However, the producing means may be constituted by only display 40, or alternatively, any other device may be constituted by the producing means. It is, furthermore, noted that the running environment information retrieving section defined in claims includes position detecting section 11, velocity detecting section 12, wiper detecting section 13, and winker detecting section 14, road map data base 20, input section 31, and mental fatigue calculating section 32, the vehicular running situation detecting section defined in claims includes velocity detecting section 12, brake depression speed detecting section 15, steering speed detecting section 16, accelerator opening angle detecting section 17, inter-vehicle distance detecting section 18, input section 31, and corrective mental fatigue calculating section 33, and producing section (or presenting section) defined in claims includes at lest one of display 40 or speaker 50 in addition to producing section 35 shown in FIG. 1.

The present invention is not limited to those embodiments described above and it is apparent that various changes and modifications may be made without departing from the sprit and scope of the present invention which is defined in the appended claims.

The entire contents of a Japanese Patent Application No. 2002-080533 (filed in Japan on Mar. 22, 2002) are herein incorporated by reference. The scope of the invention is defined with reference to the following claims.

What is claimed is:

1. An information presentation controlling apparatus, comprising:

a detecting section that detects a running slate of a mobile body and a running environment thereof;

a mental fatigue calculating section that calculates a mental fatigue that an operator of the mobile body suffers due to an operation of the mobile body from a result of detection by the detecting section;

a producing section that produces information regarding at least one of the running state or the running environment to the operator of the mobile body; and an information presentation controlling section that reduces only the amount of a plurality of information pieces which have higher priorities regarding at least one of the running state or the running environment to be produced to the operator of the mobile body through the producing section with increased mental fatigue as calculated by the mental fatigue calculating section, the information on the running state or the running environment including the plurality of information pieces corresponding to the priorities to be presented.

2. The information presentation controlling apparatus for a mobile body as claimed in claim 1, wherein the detecting section detects property and kind of a road on which the mobile body is running.

3. The information presentation controlling apparatus for a mobile body as claimed in claim 1, wherein the detecting section detects a shape of a road segment on which the mobile body is running.

4. The information presentation controlling apparatus for a mobile body as claimed in claim 1, wherein the detecting section detects a brake manipulation by the operator.

5. The information presentation controlling apparatus for a mobile body as claimed in claim 1, wherein the detecting section detects a steering operation by the operator.

6. The information presentation controlling apparatus for a mobile body as claimed in claim 1, wherein the detecting section detects a distance between a surrounding another mobile body and the mobile body.

7. The information presentation controlling apparatus for a mobile body as claimed in claim 1, wherein the detecting section detects an accelerator manipulated variable of an accelerator.

8. The information presentation controlling apparatus for a mobile body as claimed in claim 1, wherein the mental fatigue calculating section calculates the mental fatigue for a predetermined time intervals.

9. The information presentation controlling apparatus for a mobile body as claimed in claim 1, wherein the mental fatigue calculating section calculates the mental fatigue for a predetermined distances of travel of the mobile body.

10. The information presentation controlling apparatus for a mobile body as claimed in claim 1, wherein the mobile body is an automotive vehicle, the operator includes a vehicle driver, and the information producing section includes at least one of speaker and display.

11. The information presentation controlling apparatus as claimed in claim 1, wherein the operator of the mobile body is a vehicle driver and the information presentation controlling section controls the information to be produced to the vehicle driver in such a manner that, as the mental fatigue of the vehicle driver becomes higher, the quantity of information becomes reduced.

12. The information presentation controlling apparatus as claimed in claim 1, wherein the information to be produced to the operator of the mobile body is an information quantity outputted in graphics, in at least one character string, and from a speaker.

13. An information presentation controlling apparatus for an automotive vehicle, comprising:

a running environment information retrieving section that retrieves an information on a running environment of the vehicle and estimates a degree of a mental fatigue that the vehicle driver would normally suffer during a drive of the vehicle from the retrieved running environment for predetermined time intervals;

a vehicular running situation detecting section that detects a vehicular running situation and estimates a corrective mental fatigue that the vehicle driver would suffer due to a sudden happening during the drive of the vehicle from the detected vehicular running situation for the predetermined time intervals;

an accumulated mental fatigue calculating section that adds the corrective mental fatigue estimated by the vehicular running situation detecting section to the mental fatigue estimated from the running environment information retrieving section so as to determine an accumulated mental fatigue; and an information presentation controlling section that reduces only a quantity of a plurality of information pieces which have higher priorities regarding at least one of the running state or the running environment to be presented to the vehicle driver through a producing section with increased magnitude of the accumulated mental fatigue, the information on the running state or the running environment including the plurality of information pieces corresponding to the priorities to be presented.

14. The information presentation controlling apparatus for an automotive vehicle as claimed in claim 13, wherein the running environment information retrieving section retrieves property and kind of a road on which the vehicle is running and a vehicular velocity, a road shape, a time, a day of a week, and weather.

15. The information presentation controlling apparatus for an automotive vehicle as claimed in claim 13, wherein the running situation detecting section detects whether a brake is suddenly manipulated so as to exceed a predetermined velocity, or whether a steering wheel of the vehicle is steered at a velocity exceeding a predetermined velocity, whether an accelerator is suddenly manipulated, or whether a distance between another vehicle and the vehicle which is running ahead of the vehicle is equal to or below a predetermined distance.

16. An information presentation controlling method, comprising:

detecting a running state of a mobile body and a running environment thereof;

calculating a mental fatigue that an operator of the mobile body suffers due to an operation of the mobile body from a result of detecting the running state of the mobile body and the running environment thereof;

producing information regarding at least one of the running state or the running environment to the operator of the mobile body through a producing section; and reducing only the amount of a plurality of information pieces which have higher priorities regarding at least one of the running state or the running environment to be produced to the operator of the mobile body through the producing section with increase in the calculated mental fatigue, the information on the running state or the running environment including the plurality of information pieces corresponding to the priorities to be presented.

17. An information presentation controlling method for an automotive vehicle, comprising:

retrieving information on a running environment of the vehicle;

estimating a degree of a mental fatigue that the vehicle driver would normally suffer during a drive of the vehicle from the retrieved running environment for a predetermined time interval;

detecting a vehicular running situation;

estimating a corrective mental fatigue that the vehicle driver would suffer due to a sudden happening during the drive of the vehicle from the detected vehicular running situation for said predetermined time interval;

adding the estimated corrective mental fatigue to the estimated mental fatigue so as to determine an accumulated mental fatigue; and reducing only a quantity of a plurality of information pieces which have higher priorities regarding at least one of the running state or the running environment to be presented to the vehicle driver through a producing section with increased magnitude of the accumulated mental fatigue, the information on the running state or the running environment including the plurality of information pieces corresponding to the priorities to be presented.

18. An information presentation controlling apparatus, comprising:

detecting means for detecting a running state of a mobile body and a running environment thereof;

mental fatigue calculating means for calculating a mental fatigue that an operator of the mobile body suffers due to an operation of the mobile body from a result of detection by the detecting means;

producing means for producing information regarding at least one of the running state or the running environment to the operator of the mobile body; and information presentation controlling means for a plurality of information pieces which have higher priorities regarding at least one of the running state or the running environment to be produced to the operator of the mobile body through the producing means with increased mental fatigue calculated by the mental fatigue calculating means, the information on the running state or the running environment including the plurality of information pieces corresponding to the priorities to be presented.

19. An information presentation controlling apparatus for an automotive vehicle, comprising:

a running environment information retrieving section that retrieves an information on a running environment of the vehicle and estimates a degree of a mental fatigue that the vehicle driver would normally suffer during a drive of the vehicle from the retrieved running environment for each predetermined time interval;

a vehicular running situation detecting section that detects a vehicular running situation and estimates a corrective mental fatigue that the vehicle driver would suffer due to a sudden happening during the drive of the vehicle from the detected vehicular running situation for each of predetermined time intervals;

an accumulated mental fatigue calculating section that adds the corrective mental fatigue estimated by the vehicular running situation detecting section to the mental fatigue estimated from the running environment information retrieving section so as to determine an accumulated mental fatigue; and an information presentation controlling section that controls a quantity of information to be presented to the vehicle driver through a producing section in accordance with a magnitude of the accumulated mental fatigue, wherein the information presentation controlling apparatus further comprises: a vehicular power supply off determining section that determines whether a vehicular power supply is turned off, and wherein the accumulated mental fatigue value is reduced when the vehicular power supply off determining section determines that the vehicular power supply is turned off.

* * * * *